(12) United States Patent
Takatani et al.

(10) Patent No.: US 10,769,420 B2
(45) Date of Patent: Sep. 8, 2020

(54) DETECTION DEVICE, DETECTION METHOD, COMPUTER PROGRAM PRODUCT, AND INFORMATION PROCESSING SYSTEM

(71) Applicant: Kabushiki Kaisha Toshiba, Minato-ku, Tokyo (JP)

(72) Inventors: Tsuyoshi Takatani, Kawasaki Kanagawa (JP); Tsuyoshi Tasaki, Yokohama Kanagawa (JP); Mayu Okumura, Yokohama Kanagawa (JP); Manabu Nishiyama, Kawasaki Kanagawa (JP); Yuma Sano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/245,754

(22) Filed: Aug. 24, 2016

(65) Prior Publication Data

US 2017/0061203 A1 Mar. 2, 2017

(30) Foreign Application Priority Data

Aug. 31, 2015 (JP) ................................ 2015-171005

(51) Int. Cl.
*G06K 9/00* (2006.01)

(52) U.S. Cl.
CPC ..... *G06K 9/00369* (2013.01); *G06K 9/00805* (2013.01)

(58) Field of Classification Search
CPC ................................................. G06K 9/00805
See application file for complete search history.

(56) References Cited

U.S. PATENT DOCUMENTS

| 8,195,394 B1* | 6/2012 | Zhu ........................ G01C 21/26 |
| | | 382/107 |
| 2015/0379334 A1* | 12/2015 | Iwasaki .............. G06K 9/00362 |
| | | 382/104 |

(Continued)

FOREIGN PATENT DOCUMENTS

| JP | 3727400 B | 12/2005 |
| JP | 3786113 B | 6/2006 |

(Continued)

OTHER PUBLICATIONS

Watanabe et al., "Co-occurrence Histograms of Oriented Gradients for Human Detection", Transactions on Computer Vision and Application, vol. 2. pp. 39-47, 2010, 9 pages.

*Primary Examiner* — Oneal R Mistry
(74) *Attorney, Agent, or Firm* — Knobbe, Martens, Olson & Bear, LLP

(57) ABSTRACT

According to an embodiment, a detection device includes a camera, a memory, and processor circuitry. The camera is connected to an internal bus and configured to acquire an image including an area in which a mobile body is movable. The memory is connected to the internal bus and configured to store data and a program. The processor circuitry is connected to the internal bus and configured to detect at least the area, a mark on the area, and a person, from the image, calculate a first distance between the person and a position of the device when the person is in the area, and set a range according to a result of the detection and the first distance.

11 Claims, 17 Drawing Sheets

(56) References Cited

U.S. PATENT DOCUMENTS

| | | | |
|---|---|---|---|
| 2016/0004906 A1* | 1/2016 | Nerayoff | H04N 7/181 |
| | | | 382/103 |
| 2016/0019429 A1* | 1/2016 | Ishigaki | G01B 11/026 |
| | | | 348/47 |
| 2017/0140227 A1* | 5/2017 | Takemura | G08G 1/16 |
| 2017/0190301 A1* | 7/2017 | Miyagawa | B60R 21/00 |
| 2017/0217394 A1* | 8/2017 | Shima | B60R 21/00 |
| 2017/0330463 A1* | 11/2017 | Li | B60K 37/04 |

FOREIGN PATENT DOCUMENTS

| | | |
|---|---|---|
| JP | 4277658 B | 6/2009 |
| JP | 2011-134207 A | 7/2011 |

* cited by examiner

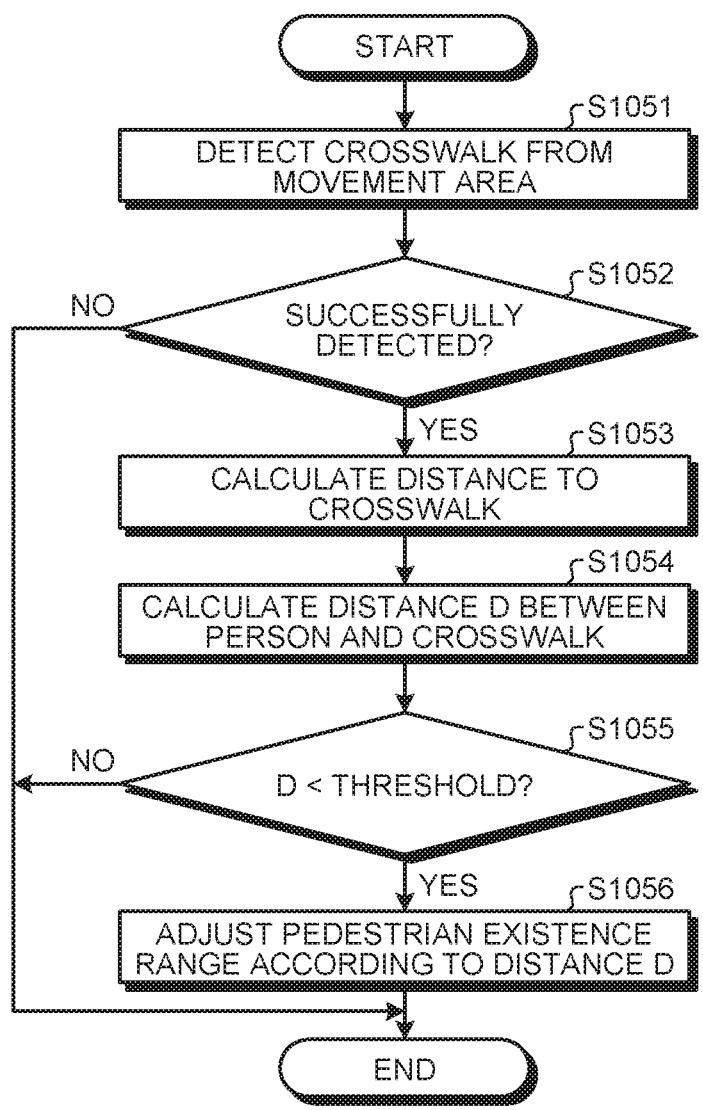

DETECTION DEVICE, DETECTION METHOD, COMPUTER PROGRAM PRODUCT, AND INFORMATION PROCESSING SYSTEM

CROSS-REFERENCE TO RELATED APPLICATION

This application is based upon and claims the benefit of priority from Japanese Patent Application No. 2015-171005, filed on Aug. 31, 2015; the entire contents of which are incorporated herein by reference.

FIELD

Embodiments described herein relate generally to a detection device, a detection method, a computer program product, and an information processing system.

BACKGROUND

Pedestrians crossing a road at a place not defined as a safety zone such as a crosswalk accounts for a large percentage of pedestrians getting into a traffic accident. When driving on a road near the safety zone, drivers empirically pay attention to pedestrians. However, when driving on a road not defined as a safety zone, the drivers generally do not consciously pay attention to the pedestrians, and thus, the drivers unlikely respond to a pedestrian suddenly appearing and crossing a road at a place not defined as a safety zone. Therefore, a technology has been proposed which uses an image captured by an on-vehicle camera to record a case likely to lead to an accident during driving a vehicle.

BRIEF DESCRIPTION OF THE DRAWINGS

FIG. 8 is an exemplary flowchart illustrating processing of changing the size of a pedestrian existence range based on a distance relationship between a mark and a pedestrian, according to the first embodiment;

DETAILED DESCRIPTION

According to an embodiment, a detection device includes a camera, a memory, and processor circuitry. The camera is connected to an internal bus and configured to acquire an image including an area in which a mobile body is movable. The memory is connected to the internal bus and configured to store data and a program. The processor circuitry is connected to the internal bus and configured to detect at least the area, a mark on the area, and a person, from the image, calculate a first distance between the person and a position of the device when the person is in the area, and set a range according to a result of the detection and the first distance.

A detection device, a detection method, a detection program, and an information processing system according to an embodiment will be described below.

The detection device, the detection method, the detection program, and the information processing system according to an embodiment, for example, detect a road as a movement area of a vehicle, and a pedestrian being a person crossing a road, from an image captured by an on-vehicle camera mounted on the vehicle, and set a pedestrian existence range in which a pedestrian is expected to be in future, according to a position at which the pedestrian is detected. When the pedestrian existence range is used, a driver can pay attention to a pedestrian crossing a road at a place not defined as a safety zone such as a crosswalk.

Figure 1:
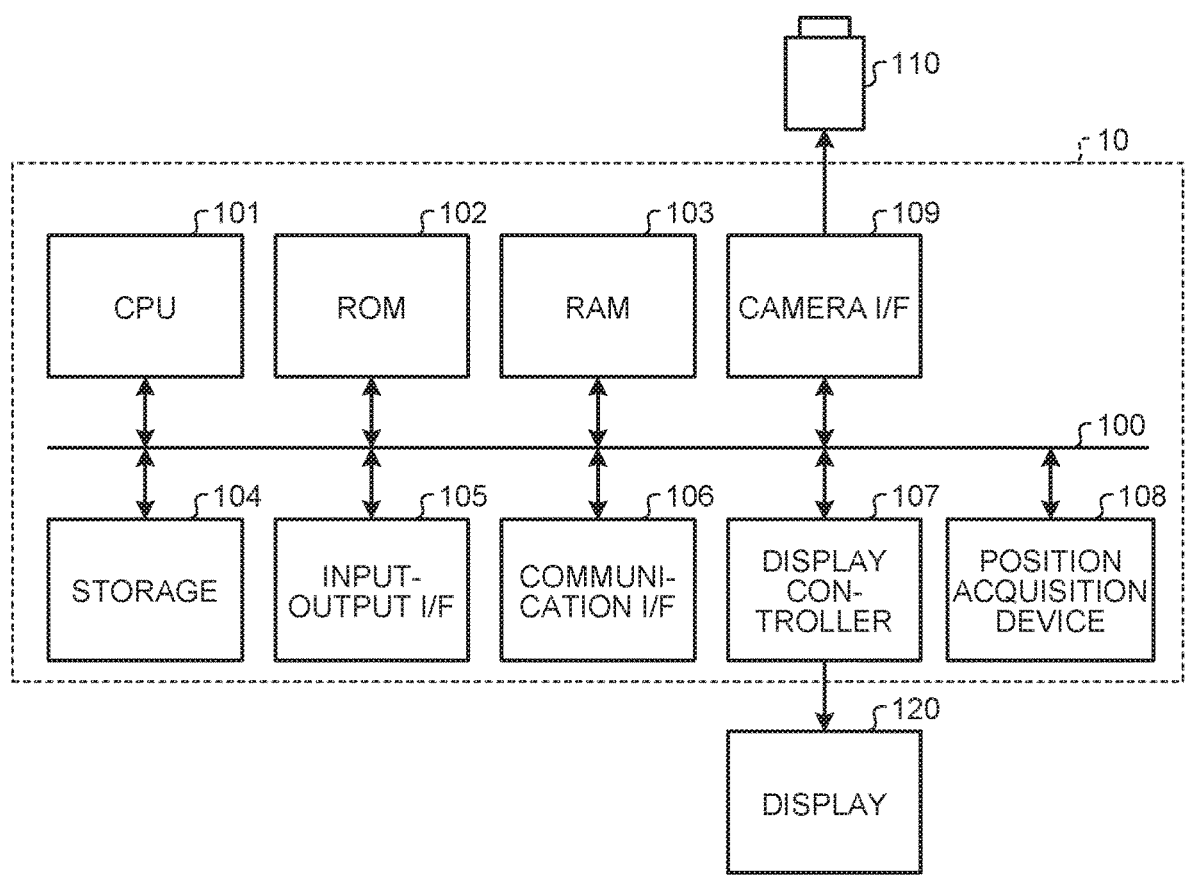
FIG. 1 is a block diagram illustrating an exemplary hardware configuration of a detection device applied commonly to embodiments.

FIG. 1 illustrates an exemplary hardware configuration of the detection device applied commonly to embodiments. In FIG. 1, as detection device 10 includes a central processing unit (CPU) 101, a read only memory (ROM) 102, a random access memory (RAM) 103, a storage 104, an input-output I/F 105, a communication I/F 106, a display controller 107, a position acquisition device 108, and a camera I/F 109, and the units are connected by a bus 100 to be communicated with each other.

The CPU 101 operates the RAM 103 as a work memory according to programs previously stored in the ROM 102 or the storage 104, and wholly controls the operation of the detection device 10. That is, a computer including the CPU 101 is mounted on the detection device 10. The storage 104 represents a hard disk drive or a non-volatile semiconductor memory (flash memory), and programs for operation of the CPU 101 or various data are stored therein.

The input-output I/F 105 includes for example a universal serial bus (USB), and is an interface for performing transmission and reception of data with an external device. An input device such as a keyboard or a pointing device (mouse or the like) can be connected to the input-output I/F 105. Further, a drive device performing reading or the like of a disk recording medium such as a compact disk (CD) or a digital versatile disk (DVD) may be connected to the input-output I/F 105. The display controller 107 converts a display control signal to a display signal, and outputs the display signal. The display control signal is generated by the CPU 101 according to a program, and the display signal is displayed on a display 120 using a liquid crystal display (LCD) or the like as a display device.

The communication I/F 106 controls communication with respect to a network such as a local area network (LAN) or the Internet.

The position acquisition device 108 acquires positional information indicating a current position. The positional information is expressed using for example latitude and longitude. The positional information may further include altitude. The position acquisition device 108 uses for example a global navigation satellite system (GNSS) to obtain a current position. The position acquisition device 108 is not limited to this configuration, and the position acquisition device 108 may use a localization system using a positional information system using a wireless LAN or an on-vehicle sensor to acquire the current position.

A camera 110 performs imaging according to control of the camera I/F 109, and outputs an image signal. The camera I/F 109 controls the camera 110 according to a command from the CPU 101, captures the image signal output from the camera 110, and outputs the image signal as a captured image.

Figure 2:
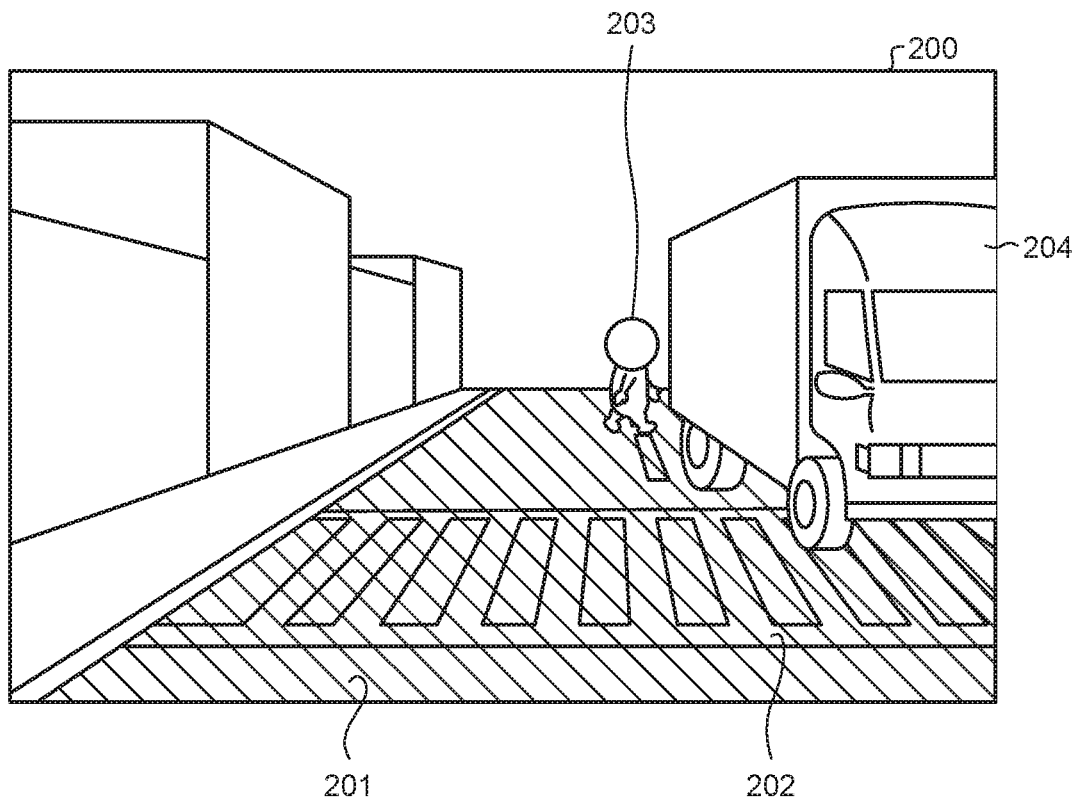
FIG. 2 is a diagram illustrating an example of a captured image captured by a camera according to embodiments.

The camera 110 is mounted, for example, on a vehicle, and is installed to provide the captured image including the movement area in which the vehicle is allowed to travel, in a traveling direction of the vehicle. FIG. 2 illustrates an example of the captured image captured by the camera 110, according to embodiments. In FIG. 2, a captured image 200 includes for example an image of a movement area 201 being a road on which the vehicle travels. Further, in an example of FIG. 2, the captured image 200 includes images of a mark 202 being a mark on the movement area 201, a person 203 crossing the movement area 201, and another vehicle 204 on the movement area 201. Note that in an example of FIG. 2, the mark 202 shows a crosswalk.

The camera 110 is not limited to a camera imaging light in the visible light region, and may employ an infrared camera capable of imaging light in the infrared region, or an ultraviolet camera capable of imaging light in the ultraviolet region. Further, in FIG. 1, although the detection device 10 is illustrated to be connected to one camera 110, the configuration is not limited to this example. For example, a plurality of cameras 110 may be connected to the detection device 10 so that the cameras 110 may be installed to be directed in different directions, for example, ahead, behind, and aside the vehicle. In the follows, one camera 110 is connected to the detection device 10, the one camera 110 being installed to image a traveling direction of the vehicle.

First Embodiment

Figure 3:
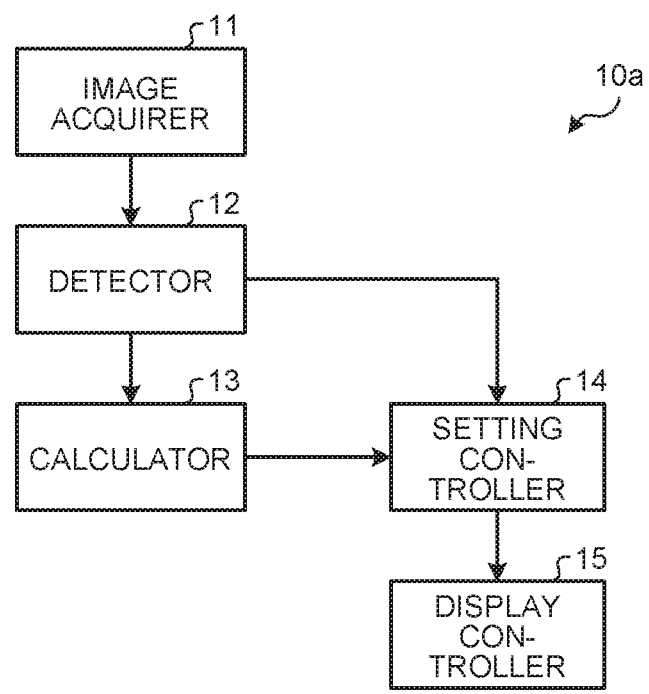
FIG. 3 is an exemplary functional block diagram illustrating a function of a detection device according to a first embodiment.

A first embodiment will be described. FIG. 3 is an exemplary functional block diagram illustrating a function of a detection device according to a first embodiment. In FIG. 3, a detection device 10a includes an image acquirer 11, a detector 12, a calculator 13, a setting controller 14, and a display controller 15. The image acquirer 11, the detector 12, the calculator 13, the setting controller 14, and the display controller 15 are achieved by a detection program executed on the CPU 101. The units are not limited to this configuration, and some or all of the image acquirer 11, the detector 12, the calculator 13, the setting controller 14, and the display controller 15 may include hardware circuits operated in cooperation with each other.

The image acquirer 11 acquires the captured image captured by the camera 110. The detector 12 detects at least an image of the person 203, an image of the movement area 201, and an image of the mark 202 on the movement area 201, from the captured image acquired by the image acquirer 11. Hereinafter, "acquire the image of the person 203" will be appropriately referred to as, for example, "acquire the person 203".

When the person 203 and the movement area 201 are detected by the detector 12, and the detected person 203 is determined to be on the movement area 201, the calculator 13 defines the detected person 203 as the pedestrian, and calculates a pedestrian distance being a distance from the vehicle to the pedestrian, based on the captured image. The setting controller 14 uses a result of the detection performed by the detector 12 and the pedestrian distance calculated by the calculator 13 to set the pedestrian existence range in which a pedestrian seems to be.

The display controller 15 causes the display 120 to display the pedestrian existence range set by the setting controller 14. For example, the display controller 15 can cause the display 120 to display the captured image 200 so that the pedestrian existence range overlaps on the captured image 200. The display controller 15 is not limited to this configuration, and the display controller 15 may cause the display 120 to display a map including the current position and display the pedestrian existence range on this map, based on the current position acquired by the position acquisition device 108.

Figure 4:
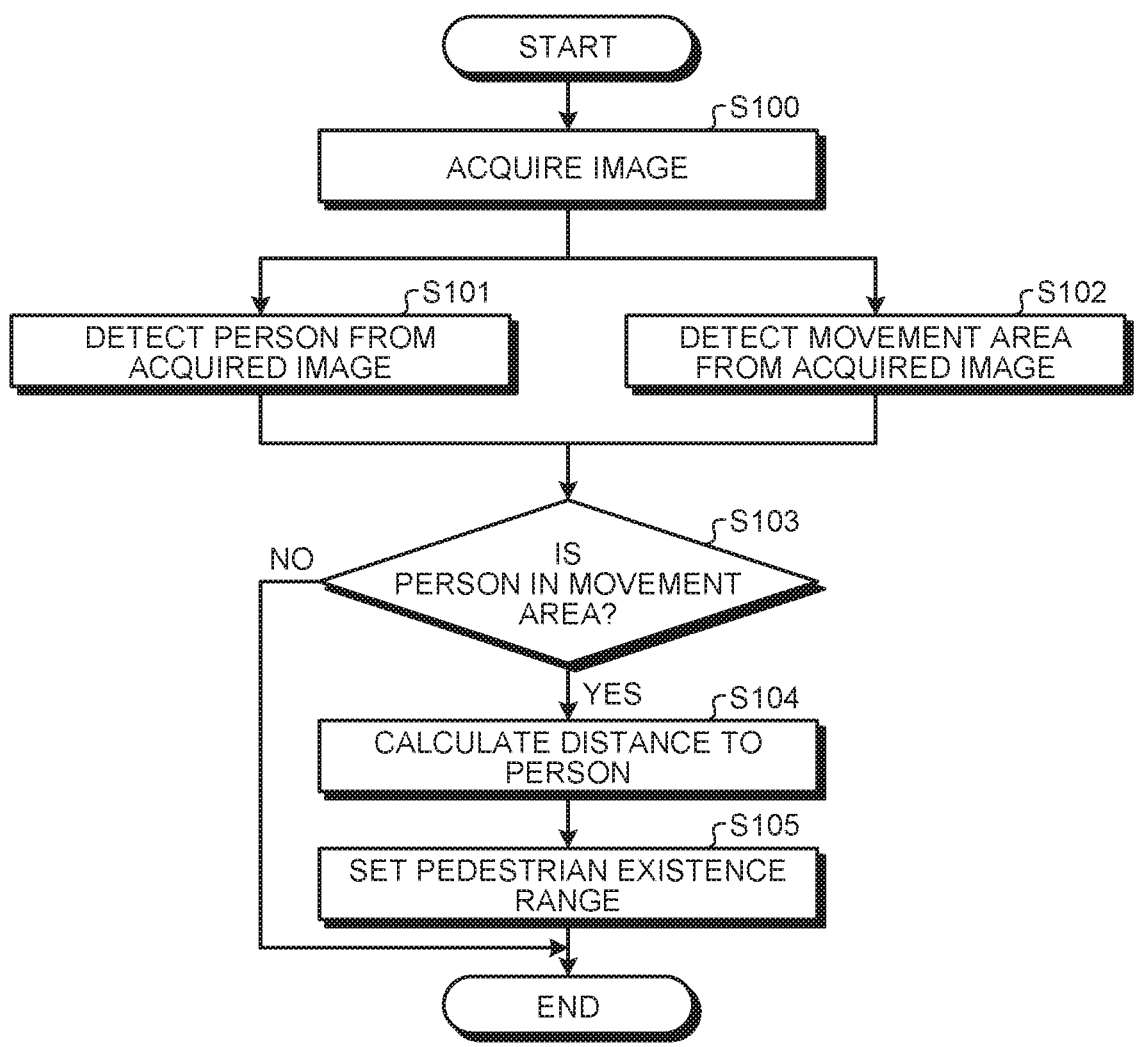
FIG. 4 is an exemplary flowchart illustrating a detection process according to the first embodiment.

FIG. 4 is an exemplary flowchart illustrating a detection process according to the first embodiment. In step S100, the image acquirer 11 acquires the captured image captured by the camera 110. In step S100, when the captured image is acquired by the image acquirer 11, the process proceeds to steps S101 and S102.

In step S101, the detector 12 detects the person 203 from the captured image acquired in step S100. Further, in step S102, the detector 12 acquires the movement area 201 from the captured image acquired in step S100. When the person 203 and the movement area 201 are detected in steps S101 and S102, the process proceeds to step S103.

Although processing of steps S101 and S102 are parallelly performed in FIG. 4, the processing is not limited to this example, and processing of steps S101 and S102 may be sequentially performed. In this configuration, steps S101 and S102 may have an arbitrary order between them.

In step S103, when both of the person 203 and the movement area 201 are detected in steps S101 and S102, the calculator 13 determines whether the person 203 is on the movement area 201. When the calculator 13 determines that the person 203 is on the movement area 201, the person 203 is defined as the pedestrian (step S103, Yes), and the process proceeds to step S104.

In contrast, in step S103, when at least one of the person 203 and the movement area 201 is not detected in steps S101 and S102 or when the person 203 and the movement area 201 are detected in steps S101 and S102 and the detected person 203 is out of the movement area 201 (step S103, No), the calculator 13 finishes a sequential process in the flowchart of FIG. 4.

In step S104, the calculator 13 calculates a distance from the vehicle (camera 110) to the pedestrian (person 203), based on the captured image 200 and an installation angle of the camera 110 relative to a horizontal direction. In the next step S105, the setting controller 14 uses the distance to the pedestrian calculated in step S104 to set the pedestrian existence range being a range in which the pedestrian seems to be. The set pedestrian existence range can be displayed on the display 120 for example with the captured image 200.

Next, the above processing of each step in the flowchart of FIG. 4 will be described further in detail. First, description will be made of a process of detecting the image of the person 203 included in the captured image 200, performed by the detector 12, in step S101. Evaluation value representing the likelihood of the person is calculated for detection of the person 203, and when the evaluation value is not less than a set threshold, existence of a person is determined.

Figure 5:
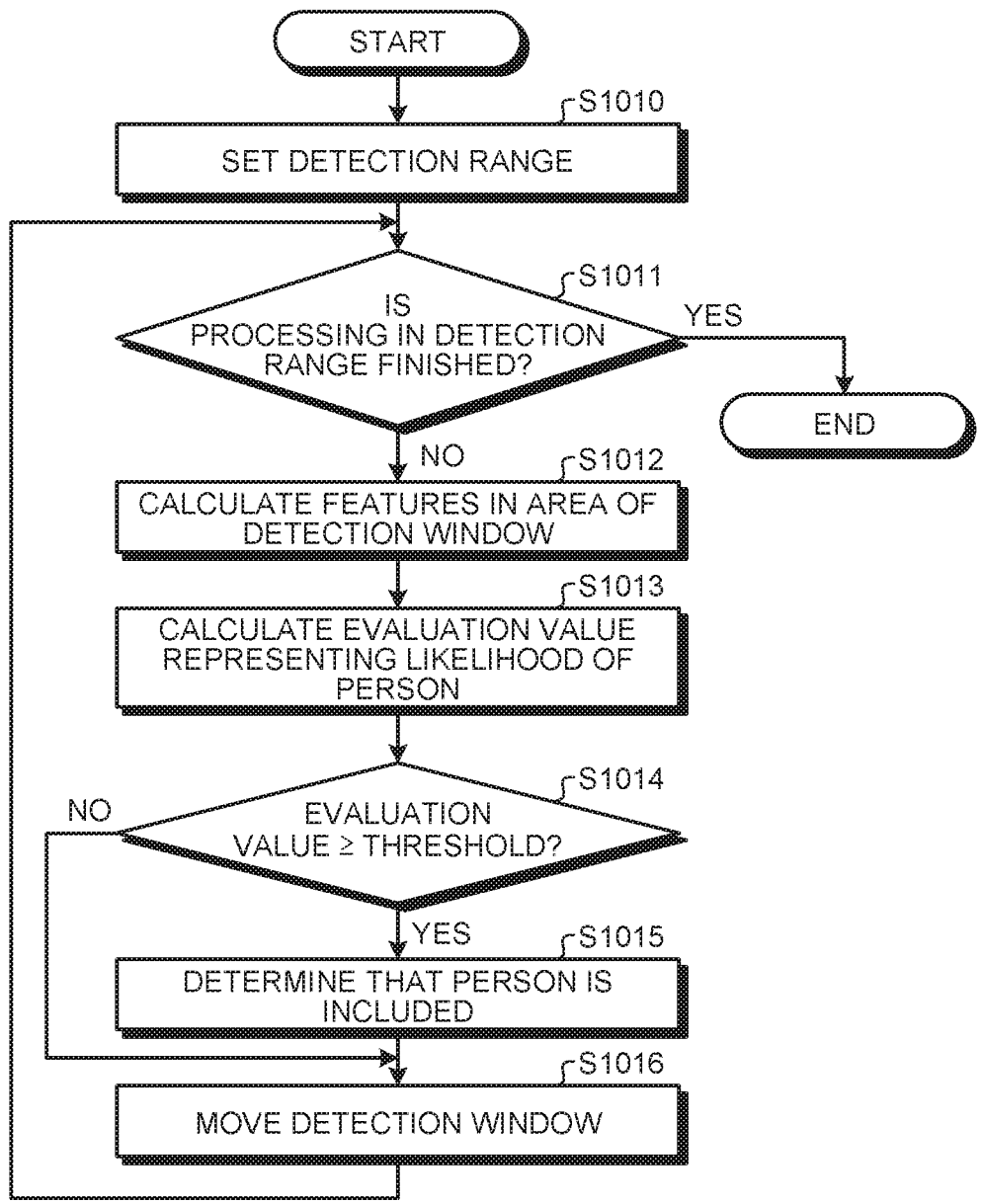
FIG. 5 is an exemplary flowchart illustrating a process of detecting a person, according to the first embodiment.

FIG. 5 is an exemplary flowchart illustrating a process of detecting the person 203 by the detector 12, according to the first embodiment. In step S1010, the detector 12 sets a detection range for person detection in the captured image 200 acquired in step S100. The detection range may be for example the whole of the captured image 200, or part of the captured image 200. For example, an area of the captured image 200 excluding the upper and lower end parts thereof can be set as the detection range. Further, a mask image may be prepared so that the mask image specifies a set area. The detector 12 sets a detection window at a predetermined position in the detection range. Size and shape of the detection window are not especially limited. Description will be made below on condition that the detection window has a rectangular shape.

In the next step S1011, the detector 12 determines whether processing in the detection range is finished. When the detector 12 determines that the processing in the detection range is finished (step S1011, Yes), a sequential process according to the flowchart of FIG. 5 is finished. When the detector 12 determines that the processing in the detection range is not finished (step S1011, No), the process proceeds to step S1012.

In step S1012, the detector 12 calculates features in an area of the detection window set in the captured image 200. The detector 12 can use for example histograms of oriented gradients (HOG) features, as the features. In step S1013, the detector 12 uses a discriminator to calculate the evaluation value representing the likelihood of the person, based on the features calculated in step S1012. The detector 12 can use, for example, a support vector machine (SVM) as the discriminator.

In the next step S1014, the detector 12 determines whether the evaluation value calculated in step S1013 is not less than the threshold set previously. When the detector 12 determines that the evaluation value is less than the threshold (step S1014, No), the process proceeds to step S1016.

In contrast, when the detector 12 determines that the evaluation value is not less than the threshold in step S1014 (step S1014, Yes), the process proceeds to step S1015, and the detector 12 determines that the person 203 is included in the detection window. Specifically, for example, a technology is used to detect a position to be detected. The technology is disclosed in Tomoki Watanabe, Satoshi Ito and Kentaro Yokoi: "Co-occurrence Histograms of Oriented Gradients for Human Detection", IPSJ Transactions on Computer Vision and Applications, Vol. 2, pp. 39-47. (2010). After the processing of step S1015, the process proceeds to step S1016.

In step S1016, the detector 12 moves the detection window, and the process returns to step S1011.

Next, description will be made of a process of detecting the image of the movement area 201 included in the captured image 200, performed by the detector 12, in step S102 in the flowchart of FIG. 4. For detection of the movement area 201, the detector 12 previously acquires, for example, an installation attitude of the camera 110, and when a road surface (movement area 201) is assumed to have a constant width, an area in which the road surface is shown can be calculated based on the installation attitude. The installation attitude includes for example, a depression angle of the camera 110, an angle between an imaging direction of the camera 110 and the traveling direction of the vehicle, and an installation height of the camera 110. The detector 12 is not limited to this configuration, and the detector 12 may previously set an area including the movement area 201 in the captured image 200 based on an installation position of the camera 110, detect a straight line in the set area by Hough transform or the like, and detect, as the movement area 201, an area surrounded by two straight lines passing near a vanishing point.

Next, description will be made of a process of determining whether the person 203 is in the movement area 201, performed by the calculator 13, in step S103 in the flowchart of FIG. 4. The calculator 13 uses the person 203 and the movement area 201 detected by the detector 12 in steps S101 and S102 to determine whether the person 203 is in the movement area 201. When existence of the person 203 is determined, the person 203 is defined as the pedestrian.

For example, the calculator 13 can determine whether the person 203 is in the movement area 201, based on whether a lower end of the detection window is included in the movement area 201. The detection window is determined to include the person 203 by the detector 12, in step S1015 in the flowchart of FIG. 5. In this example, when the lower end of the detection window is included in the movement area 201, the person 203 can be determined to be in the movement area 201.

Further, for example, in the detection window determined to include the person 203 in step S1015, a foot area of the person 203 is further detected, and the person 203 can be determined whether to be in the movement area 201, based on whether the detected foot area is included in the movement area 201. In this example, when the foot area is included in the movement area 201, the person 203 can be determined to be in the movement area 201.

For detection of the foot area, the above method described in person detection can be used. For example, the detector 12 obtains features of the captured image 200, and uses the discriminator to calculate an evaluation value representing the likelihood of the foot area, based on the obtained features. The evaluation value is determined using a threshold to detect the foot area.

Next, description will be made of a process of calculating a distance between the person 203 and the vehicle (camera 110) performed by the calculator 13, in step S104 in the flowchart of FIG. 4. For example, when two or more cameras 110 are mounted to the vehicle, the distance between the camera 110 and the pedestrian (person 203) can be readily obtained by a stereo method.

When one camera 110 is mounted to the vehicle, the installation attitude of the camera 110 is used to calculate the distance between the camera 110 and the pedestrian, based on foot position information representing a position of the foot area of the pedestrian on the captured image 200.

Figure 6:
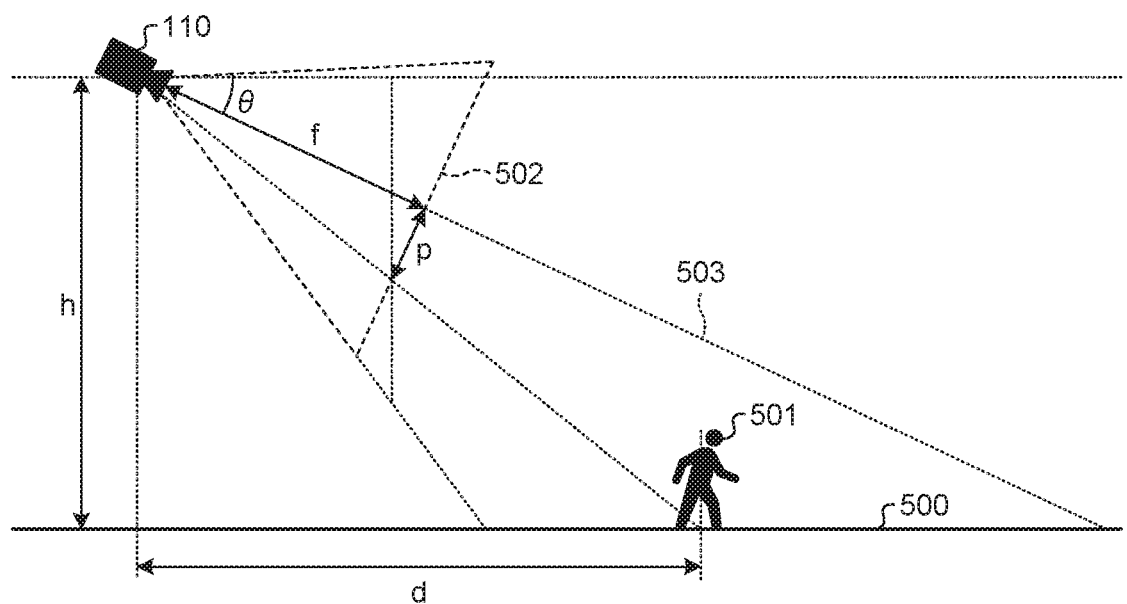
FIG. 6 is a diagram illustrating a distance calculation method using an installation attitude of one camera, according to the first embodiment.

A distance calculation method using the installation attitude of one camera 110, according to the first embodiment, will be described, using FIG. 6. In FIG. 6, the camera 110 having a focal distance f should be assumed to be installed at a position having a height h from a road surface 500 to have a depression angle θ of the imaging direction 503. A straight line 502 perpendicularly intersecting the imaging direction 503 at a position corresponding to the focal distance f represents the captured image 200 virtually captured by the camera 110. Further a value p represents a position of the foot area of a person 501 relative to the center of the captured image 200, that is, an intersection point between the imaging direction 503 and the straight line 502.

In this configuration, a distance d between the foot area of the person 501 and a position at which the perpendicular line from the camera 110 intersects the road surface 500 can be calculated by Equation (1).

$$d = \frac{h\cos\theta(f\cos\theta - p\sin\theta)}{\sin\theta(f\cos\theta - p\sin\theta) + p} \quad (1)$$

Next, description will be made of a process of setting the pedestrian existence range performed by the setting controller 14, in step S105 in the flowchart of FIG. 4. In step S105, the setting controller 14 sets the range in which the pedestrian seems to be, based on a result of detection by the detector 12, and the distance d between the camera 110 and the pedestrian (person 203) calculated by the calculator 13. That is, the setting controller 14 sets the pedestrian existence range being a range in which the same or different pedestrian seems to be, not at time when pedestrian is monitored but at subsequent time.

As described above, a range in which the pedestrian may be in future can be set and stored to previously call the driver's attention before actual detection of the pedestrian, after time when the pedestrian is detected.

First, the setting controller 14 sets a range having a predetermined size, around the position at which the pedestrian is detected, and the range is defined as the pedestrian existence range. The position at which the pedestrian is detected is, for example, a position corresponding to the distance d calculated in the above-mentioned step S104, the position being in the imaging direction of the camera 110 on a horizontal plane, from the position of the camera 110.

Figure 7A:
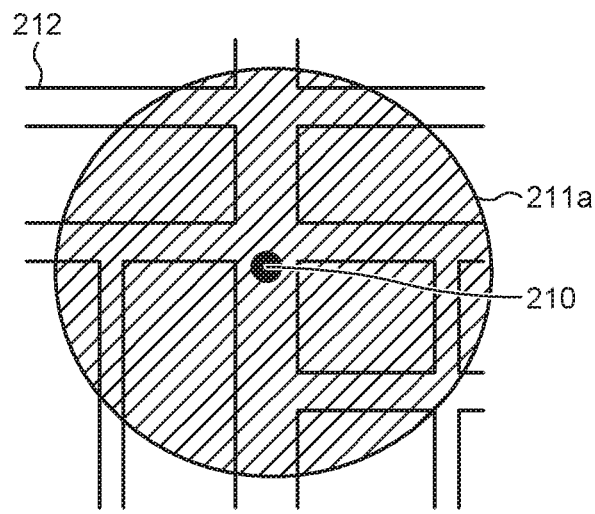
FIGS. 7A, 7B, and 7C are diagrams illustrating exemplary shapes of pedestrian existence ranges according to the first embodiment, on a two-dimensional map.
Figure 7B:
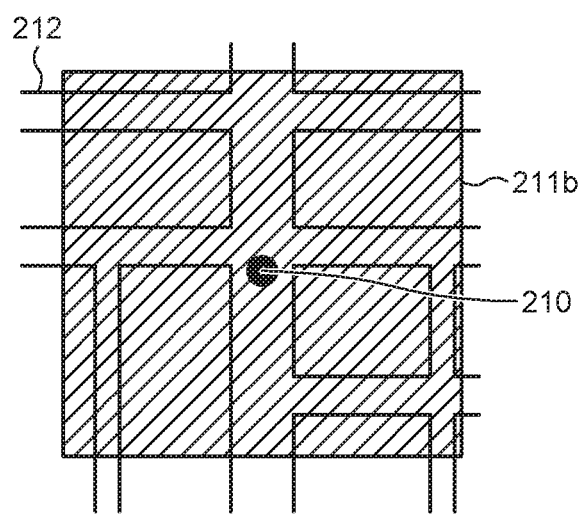
Figure 7C:
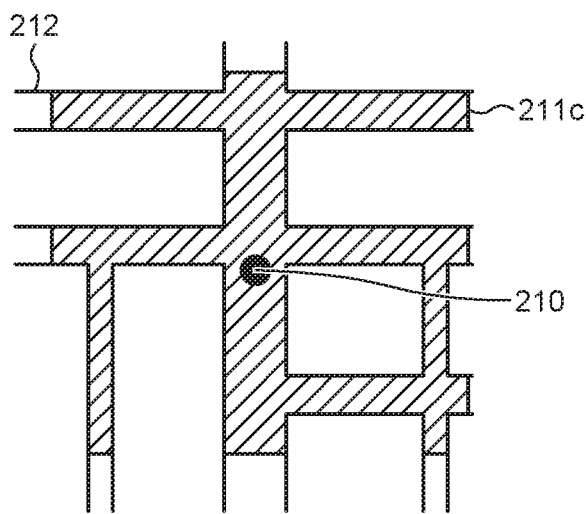

FIGS. 7A, 7B, and 7C are diagrams illustrating exemplary shapes of pedestrian existence ranges according to the first embodiment, on a two-dimensional map. FIG. 7A illustrates an example of a pedestrian existence range 211a set into a circular shape having a predetermined radius, around a pedestrian detection position 210. FIG. 7B illustrates an example of a pedestrian existence range 211b set into a rectangle (square in this example) having a side of predetermined length, around the pedestrian detection position 210. Further, FIG. 7C illustrates an example of a pedestrian existence range 211c set along the shape of a road 212, around the pedestrian detection position 210.

In terms of size of the pedestrian existence range, for example, the pedestrian existence range 211a having a circular shape of FIG. 7A may have a radius being several times larger than the width of the road. For example, when the width of the road is 10 meters, the radius of the pedestrian existence range 211a may be several ten meters (e.g., approximately 20 meters to 30 meters).

Further, in the first embodiment, the size of the pedestrian existence range is changed according to a result of detection by the detector 12. As an example, the size of the pedestrian existence range can be changed based on a distance relationship between the mark 202 (crosswalk) and the pedestrian which are detected from the captured image 200.

An exemplary process of changing the size of the pedestrian existence range based on the distance relationship between the mark 202 and the pedestrian, according to the first embodiment will be described, using a flowchart of FIG. 8. In step S1051, the detector 12 detects for example a crosswalk area from the movement area 201, as one of the mark 202.

The detector 12 can use, as a method of detecting the crosswalk area, for example the method having been described in person detection. For example, the detector 12 obtains features of the captured image, and uses the discriminator to calculate an evaluation value representing the likelihood of the crosswalk, based on the obtained features. The evaluation value is determined using a threshold to detect the crosswalk area. The features are not limited to the HOG feature, and Gabor features can be used as features effectively using a brightness difference.

In step S1052, the detector 12 determines whether the crosswalk area is successfully detected. When the crosswalk area is determined to be successfully detected (step S1052, Yes), the process proceeds to step S1053. In contrast, when the detection of the crosswalk area results in failure (step S1052, No), a sequential process in the flowchart of FIG. 8 is finished.

In step S1053, the calculator 13 calculates a distance from the camera 110 to the crosswalk area detected in step S1052. The mark 202 exists on the road surface, that is, on the movement area 201, and thus the distance can be calculated using Equation (1). In the next step S1054, the calculator 13 calculates a distance D between the mark 202 and the pedestrian (person 203), based on the distance calculated in step S104 in the flowchart of FIG. 4, and the distance to the crosswalk area calculated in step S1053.

In the next step S1055, the setting controller 14 determines whether the distance D calculated in step S1054 is less than a threshold. When the setting controller 14 determines that the distance D is not less than the threshold (step S1055, No), the sequential process according to the flowchart of FIG. 8 is finished. In contrast, in step S1055, when the setting controller 14 determines that the distance D is less than the threshold (step S1055, Yes), the process proceeds to step S1056.

In step S1056, the setting controller 14 adjusts the size of the pedestrian existence range according to a value of the distance D. In the first embodiment, the setting controller 14 reduces the pedestrian existence range at a constant rate.

For example, the setting controller 14 adjusts the distance D and the size of the pedestrian existence range to be inversely proportional. In this configuration, in the case of the pedestrian existence range 211a having a circular shape of FIG. 7A, the distance D and the radius of the pedestrian existence range 211a may be adjusted inversely to each other. The setting controller 14 is not limited to this configuration, and the setting controller 14 may adjust the size of the pedestrian existence range to be inversely proportional to the square of the distance D. Further, when the distance D is not less than the threshold, the setting controller 14 may increase the pedestrian existence range according to the distance D.

As described above, according to the first embodiment, when the pedestrian crossing the road at a place other than the crosswalk is detected in the road on which the vehicle travels, the pedestrian existence range having a predetermined size is set to the position of the detected pedestrian. When the pedestrian existence range set as described above is used, the range in which the pedestrian may be can be shown to the driver, and the driver's attention can be drawn.

Modification of First Embodiment

Figure 9:
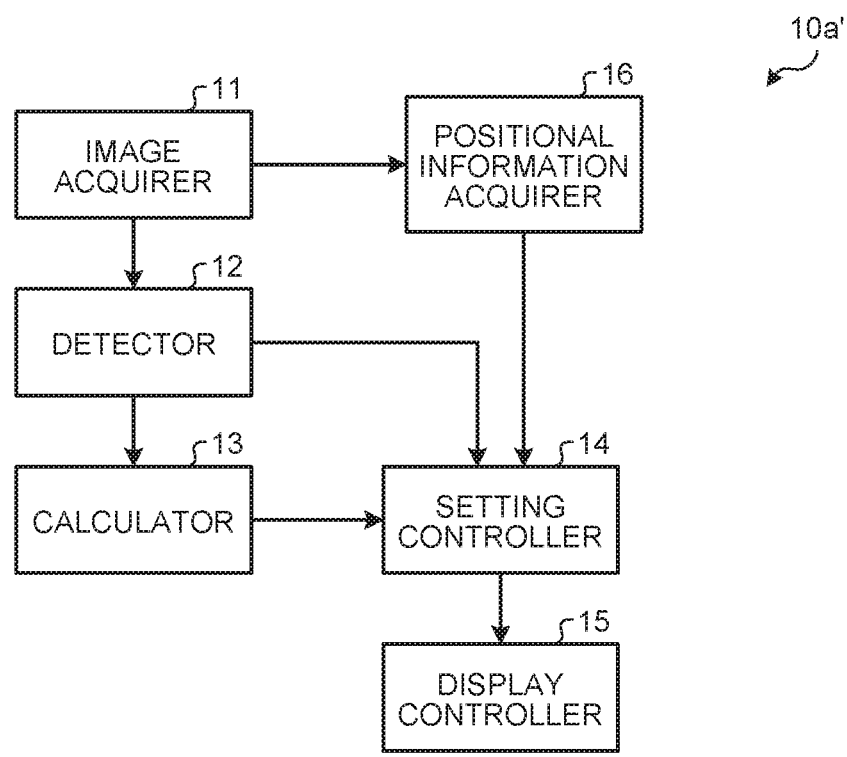
FIG. 9 is an exemplary functional block diagram illustrating a function of a detection device according to a modification of the first embodiment.

A modification of the first embodiment will be described. FIG. 9 is an exemplary functional block diagram illustrating a function of a detection device according to the modification of the first embodiment Note that in FIG. 9, parts common to those having been illustrated in FIG. 3 are denoted by the same reference signs, and detailed description thereof will be omitted.

In FIG. 9, a detection device 10a' additionally includes a positional information acquirer 16, compared with the detection device 10a illustrated in FIG. 3. The positional information acquirer 16 uses the position acquisition device 108 to acquire the current position. The positional information acquirer 16 transmits acquired positional information to the setting controller 14. Further, the positional information acquirer 16 acquires a position at which the captured image is acquired, according to a captured-image acquisition notification from the image acquirer 11, and transmits positional information indicating the position to the setting controller 14. For example, the setting controller 14 adds the positional information transmitted from the positional information acquirer 16 to the set pedestrian existence range, and can cause the display controller 15 to display the pedestrian existence range on the two-dimensional map, as illustrated in FIGS. 7A to 7C.

Further, information about the set pedestrian existence range can be stored for example in the storage 104 in association with the positional information. In this configuration, when the vehicle travels at a position near the stored positional information, even if a pedestrian is not actually detected at that time, the pedestrian existence range can be shown to the driver in consideration of the probability of existence of a pedestrian. Therefore, the driver's attention can be drawn.

Second Embodiment

Figure 10:
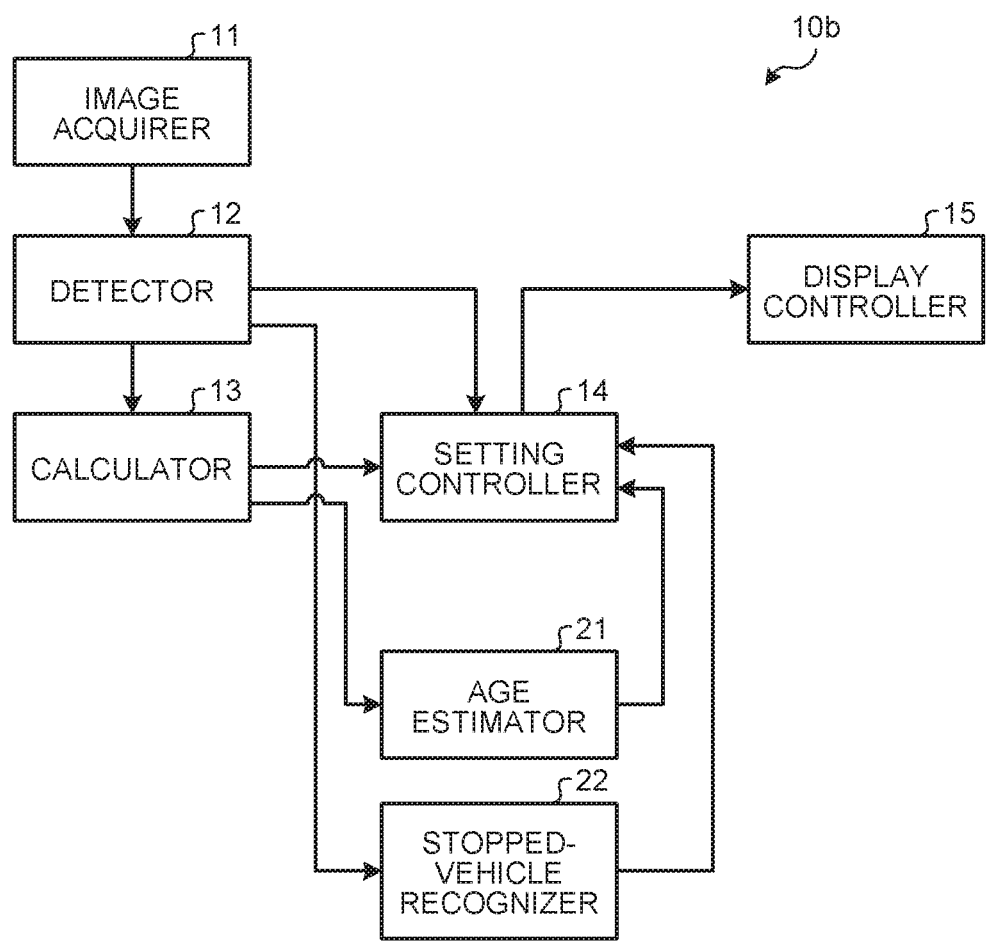
FIG. 10 is an exemplary functional block diagram illustrating function of a detection device according to a second embodiment.

Next, a second embodiment will be described. FIG. 10 is an exemplary functional block diagram illustrating function of a detection device according to the second embodiment. Note that in FIG. 10, parts common to those having been illustrated in FIG. 3 are denoted by the same reference signs, and detailed description thereof will be omitted.

In FIG. 10, a detection device 10b additionally includes an age estimator 21 and a stopped-vehicle recognizer 22, compared with the detection device 10a illustrated in FIG. 3. The age estimator 21 recognizes attribute information of the pedestrian obtained by the calculator 13 in step S103 of FIG. 4, based on an image of the pedestrian in the captured image 200, and estimates the age of the pedestrian based on the recognized attribute information. Further, in the detection device 10b, the detector 12 further detects the other vehicle 204 being in the movement area 201 from the captured image 200 acquired by the image acquirer 11. The stopped-vehicle recognizer 22 recognizes whether the other vehicle 204 detected by the detector 12 stops.

The setting controller 14 changes the size of the set pedestrian existence range according to the age of the pedestrian estimated by the age estimator 21. Further, the setting controller 14 obtains a positional relationship between the other vehicle 204 recognized by the stopped-vehicle recognizer 22, and the pedestrian obtained by the calculator 13, and changes the size of the pedestrian existence range according to the obtained positional relationship.

Figure 11:
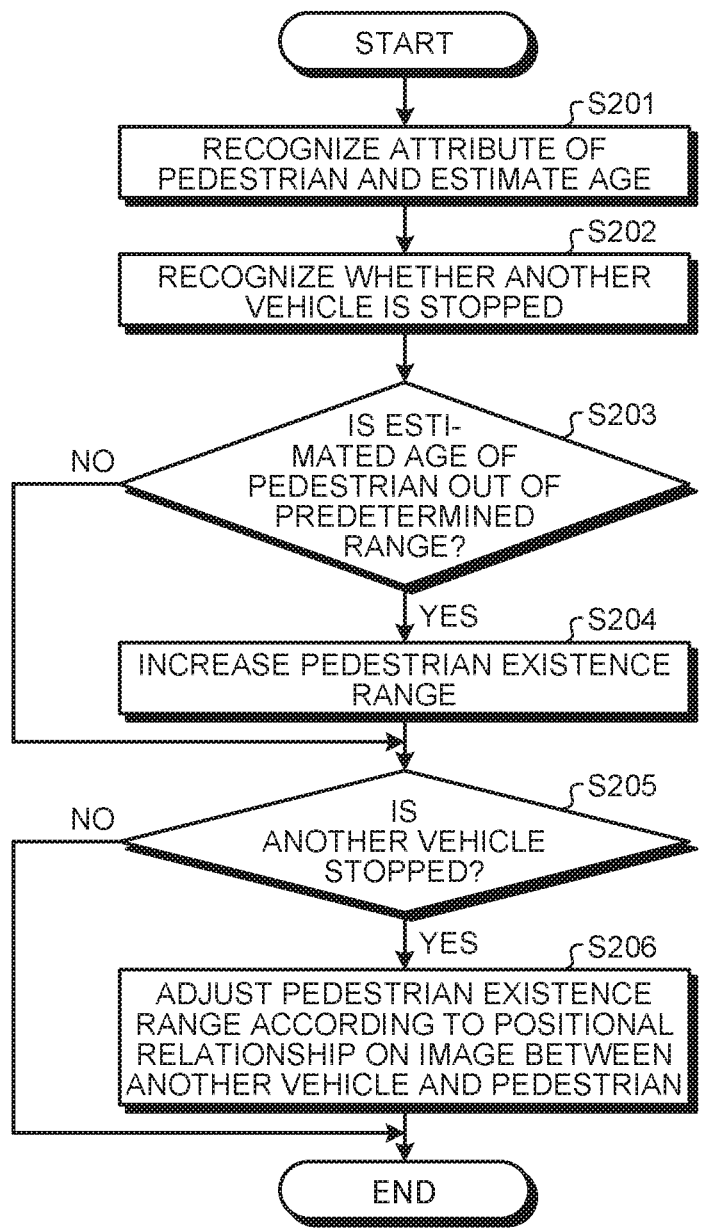
FIG. 11 is an exemplary flowchart illustrating a detection process according to the second embodiment.

FIG. 11 is an exemplary flowchart illustrating a detection process according to the second embodiment. Note that the flowchart of FIG. 11 is performed after setting the pedestrian existence range by processing of step S105 in the flowchart of FIG. 4.

In step S201, the age estimator 21 recognizes attribute information of the pedestrian obtained by the calculator 13 based on the image of the pedestrian, and estimates the age of the pedestrian based on the recognized attribute information. In the next step S202, the stopped-vehicle recognizer 22 recognizes whether the other vehicle 204 detected by the detector 12 is a stopped vehicle. Note that processing of steps S201 and S202 may be exchanged in the order or may be performed in parallel.

In the next step S203, the setting controller 14 determines whether the age estimated by the age estimator 21 in step S201 is out of a predetermined age range. When the setting controller 14 determines that the estimated age is within the predetermined age range (step S203, No), the process proceeds to step S205. In contrast, when the setting controller 14 determines that the estimated age is out of the predetermined age range (step S203, Yes), the process proceeds to step S204.

In step S204, the setting controller 14 increases the pedestrian existence range set in step S105 in the flowchart of FIG. 4. Then, the process proceeds to step S205.

Determination process of step S203 determines whether the pedestrian is an older person or a younger person, and the predetermined age range is set, for example, to a range not less than ten-years old and less than 60-years old. In this condition, when the estimated age is less than ten-years old or not less than 60-years old, the estimated age is determined to be out of the predetermined age range, the process proceeds to step S204, and the pedestrian existence range is increased. The older person or the younger person is considered to be slow in action (e.g., older person and younger person), or considered to be unstable in action (e.g., younger person), compared with those of the other ages (defined as general adult). Therefore, when the pedestrian is considered to be the older person or the younger person, the pedestrian existence range is increased in step S204, and the effect of drawing the driver's attention is increased.

In step S205, the stopped-vehicle recognizer 22 determines whether the other vehicle 204 detected by the detector 12 is stopped, according to a result of the recognition in step S202. When the stopped-vehicle recognizer 22 determines that the other vehicle 204 is not stopped, that is, the other vehicle 204 moves (step S205, No), a sequential process according to the flowchart of FIG. 11 is finished. In contrast, when the stopped-vehicle recognizer 22 determines that the detected other vehicle 204 is stopped (step S205, Yes), the process proceeds to step S206.

In step S206, the setting controller 14 adjusts the size of the pedestrian existence range, based on a positional relationship between the pedestrian and the other vehicle 204 recognized to be stopped on the captured image 200. Then, the sequential process according to the flowchart of FIG. 11 is finished.

Next, description will be made of an age estimation process performed by the age estimator 21, in step S201. The age estimator 21 recognizes, based on the image of the pedestrian, the attribute information about the pedestrian detected by the detector 12. As the attribute information about the pedestrian, for example, the pedestrian's gender, skin color, height, clothing, personal effects, and physical features can be considered. The age estimator 21 estimates the age of the pedestrian, based on the recognized attribute information about the pedestrian. For example, the age estimator 21 can estimate age based on height of the attribute information about the pedestrian. In this configuration, when the height of the pedestrian is not more than a predetermined value, the pedestrian may be considered to be the older person or the younger person.

The height of the pedestrian can be recognized, applying the method of calculating the distance from the camera 110 to the pedestrian, performed by the calculator 13 in step S104 of FIG. 4. For example, the foot area and a head area of the pedestrian are recognized from the image of the pedestrian, and the height is recognized based on positions of the recognized foot area and head area in the captured image 200, and a distance to the foot area of the pedestrian. As an example, a threshold of height is set, and height in the captured image 200 (number of pixels) corresponding to a threshold height is previously obtained for each distance. The height of the pedestrian can be calculated based on height from the foot area to the head area of the pedestrian, and the distance.

The age estimation process is not limited to this configuration, and the pedestrian's age can be also estimated based on a movement speed of the pedestrian. In this configuration, when the pedestrian is tracked in time series to obtain his/her movement speed, and the obtained movement speed is not more than a set threshold, the pedestrian may be determined to be an older person or a younger person.

Next, description will be made of a process of recognizing the stopped vehicle performed by the stopped-vehicle recognizer 22, in step S202. The stopped-vehicle recognizer 22 traces the other vehicle 204 detected by the detector 12 in time series, and determines, based on an amount of movement thereof, whether the other vehicle 204 moves or is stopped. Similarly to the processing of step S104 in the flowchart of FIG. 4, a distance from the camera 110 to the other vehicle 204 can be calculated, based on a lower end area of the other vehicle 204. Thus, the other vehicle 204 is traced in time series to sequentially obtain distances to the other vehicle 204 in time series, and the speed of the other vehicle 204 relative to the vehicle can be calculated. The calculated speed may be employed as the amount of movement.

Next, description will be made of a process according to the positional relationship between the other vehicle 204 and the pedestrian on the captured image 200, in step S206. When the stopped-vehicle recognizer 22 recognizes that the other vehicle 204 is stopped, the setting controller 14 adjusts the size of the pedestrian existence range according to a distance between the stopped other vehicle 204 and the pedestrian. The distance between the stopped other vehicle 204 and the pedestrian may be a distance on the captured image 200, or may be actual distances of the other vehicle 204 and the pedestrian which are calculated, as described above.

The setting controller 14 uses, for example, a foot position of the pedestrian and a lower end position of a stopped vehicle area, on the captured image 200, and obtains a positional relationship between the pedestrian and the stopped vehicle in the captured image 200.

Figure 12:
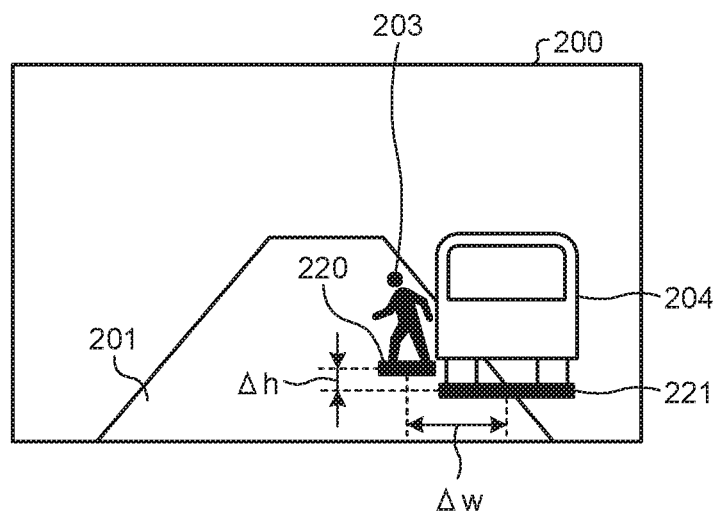
FIG. 12 is a diagram illustrating a positional relationship between a pedestrian and a stopped vehicle in a captured image.

The positional relationship between the pedestrian and the stopped vehicle in the captured image 200 will be described, using FIGS. 12 and 13. As illustrated in FIG. 12, a difference in horizontal coordinate value in the captured image 200 is defined as a width Δw, and a difference in vertical coordinate value therein is defined as a height Δh, between the foot position 220 of the detected pedestrian (person 203) and the lower end position 221 of the stopped vehicle (other vehicle 204), in the captured image 200. Further, the setting controller 14 sets thresholds for the width Δw and the height Δh.

Figure 13A:
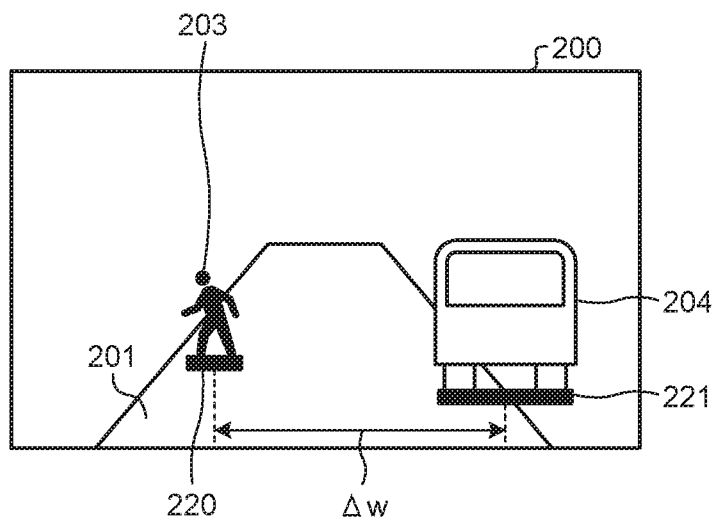
FIGS. 13A and 13B are diagrams illustrating positional relationships between a pedestrian and a stopped vehicle in captured images.
Figure 13B:
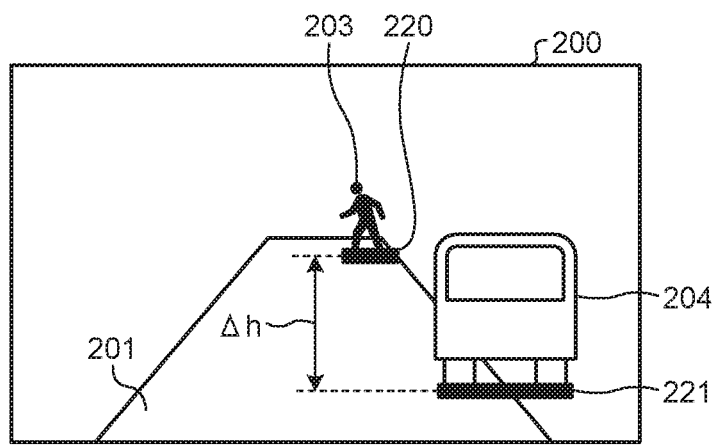

FIG. 13A illustrates an example of the width Δw not less than the threshold. Further, FIG. 13B illustrates an example of the height Δh not less than the threshold. When the width Δw and the height Δh are not more than the thresholds, respectively, the setting controller 14 determines that the distance between the other vehicle 204 and the pedestrian is small in an actual space. In this condition, the setting controller 14 for example increases the pedestrian existence range. Further, for example, when the width Δw and the height Δh are not less than the thresholds, respectively, the setting controller 14 determines that the distance between the other vehicle 204 and the pedestrian is large in the actual space. In this condition, the setting controller 14 for example reduces the pedestrian existence range. Otherwise, the setting controller 14 does not adjust the pedestrian existence range in step S206.

Note that the above method of determining the positional relationship between the pedestrian and the stopped vehicle is not limited to the above-mentioned example. For example, when at least one of the height Δh and the width Δw is not less than the threshold, the distance between the other vehicle 204 and the pedestrian may be determined to be large.

As described above, in the second embodiment, the pedestrian existence range set according to the process of the first embodiment is further adjusted based on the attribute information about the pedestrian or the distance between the pedestrian and the stopped vehicle. Therefore, the driver's attention can be further accurately drawn.

Third Embodiment

Figure 14:
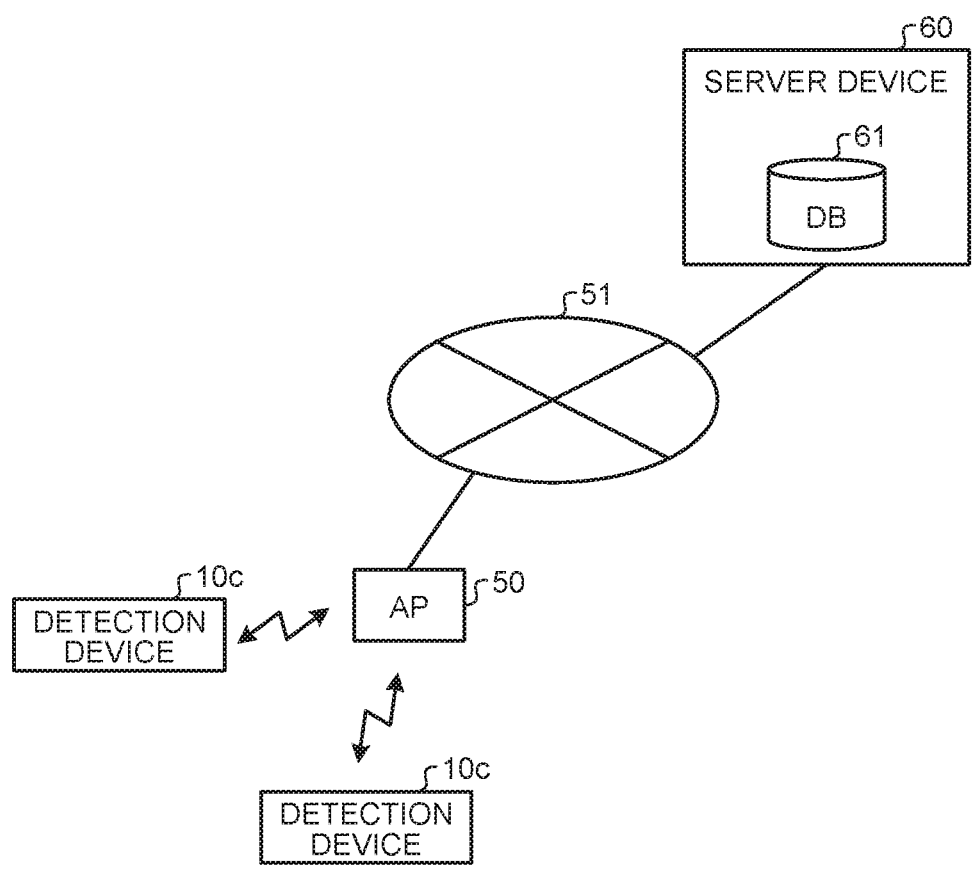
FIG. 14 is a diagram illustrating an exemplary configuration of an information processing system according to a third embodiment.

Next, a third embodiment will be described. FIG. 14 illustrates an exemplary configuration of an information processing system according to the third embodiment. In FIG. 14, the information processing system includes a server device 60 including a database (DB) 61, and one or more detection devices 10c, 10c, and . . . are connected to a network 51 by wireless communication to perform communication with the server device 60 through the network 51. An AP 50 is a relay device for connecting the detection devices 10c, 10c, and . . . to the network 51 by wireless communication. Although wireless communication performed by each detection device 10c is not limited in communication method as long as data communication is allowed with a predetermined communication party, a wireless local area network (LAN) can be employed.

In the third embodiment, in such a configuration, each detection device 10c associates the information about the set pedestrian existence range with the positional information indicating the position at which the pedestrian existence range is set, and stores the information in the RAM 103 or the storage 104. When another set of a pedestrian existence range and positional information is acquired, after a set of a pedestrian existence range and positional information has been stored, each detection device 10c determines whether the acquired positional information is included in the stored pedestrian existence range.

Further, each detection device 10c transmits the set of the information about the pedestrian existence range and the positional information stored in the RAM 103 or the storage 104 to the server device 60. The server device 60 cumulatively stores, in the DB 61, the set of the information about the pedestrian existence range and the positional information transmitted from each detection device 10c. Further, the server device 60 transmits the set of the information about the pedestrian existence range and the positional information stored in the DB 61 to each detection device 10c.

Therefore, the driver of the vehicle on which the detection device 10c is mounted can know, for example, the pedestrian existence range in a position where the vehicle has not been traveled in the past, and the driver can pay attention to even a place where the vehicle has not traveled.

Figure 15:
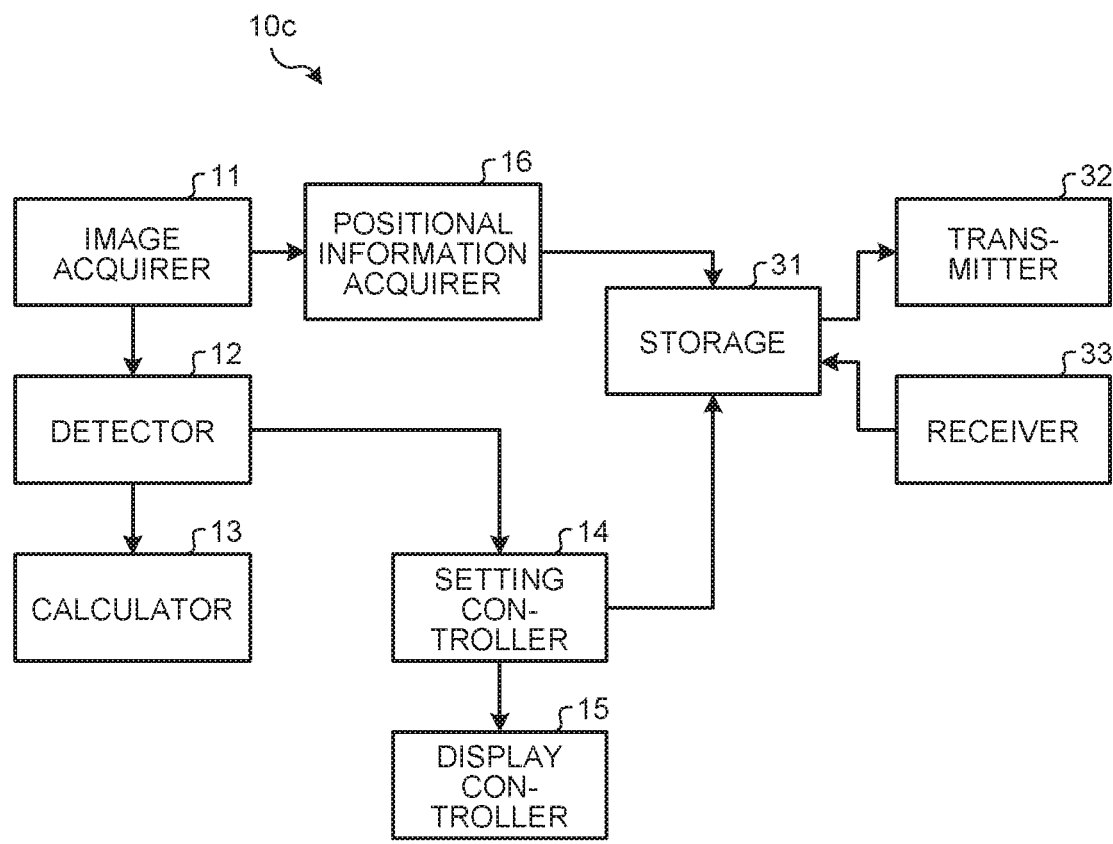
FIG. 15 is an exemplary functional block diagram illustrating a function of a detection device according to the third embodiment.

FIG. 15 is an exemplary functional block diagram illustrating a function of the detection device 10c according to the third embodiment. Note that in FIG. 15, parts common to those having been illustrated in FIG. 9 are denoted by the same reference signs, and detailed description thereof will be omitted.

In FIG. 15, the detection device 10c additionally includes a storage 31, a transmitter 32, and a receiver 33, compared with the detection device 10a' illustrated in FIG. 9. The storage 31 controls writing and reading to the RAM 103 or the storage 104 to store and read information. The transmitter 32 transmits the information stored in the storage 31 by wireless communication. The receiver 33 receives information transmitted by wireless communication, and transmits the information to the storage 31.

Note that the age estimator 21 and the stopped-vehicle recognizer 22 illustrated in FIG. 10 may be added to the configuration of FIG. 15 to adjust the set pedestrian existence range, based on an estimated age of the pedestrian, the positional relationship between the pedestrian and the stopped vehicle, or the like.

Figure 16:
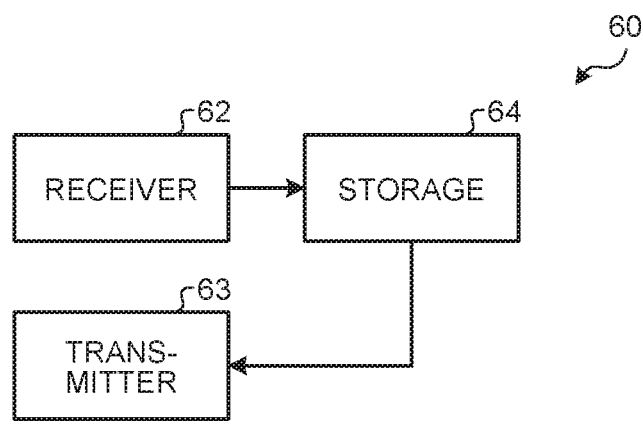
FIG. 16 is an exemplary functional block diagram illustrating a function of a server device according to the third embodiment.

FIG. 16 is an exemplary functional block diagram illustrating a function of the server device 60 according to the third embodiment. Note that the server device 60 can be configured as a general computer including hardware, i.e. a CPU, a ROM, a RAM, a storage, a communication I/F or the like, and detailed description thereof will be omitted. The server device 60 is not limited to a configuration of a single device, and may have for example functions distributed to a plurality of devices.

In FIG. 16, the server device 60 includes a receiver 62, a transmitter 63, and a storage 64. The storage 64 controls writing and reading to the DB 61 to store and read information. The receiver 62 receives information transmitted through the network 51, and transmits the received information to the storage 64. The transmitter 63 transmits the information stored in the storage 64 through the network 51.

Figure 17:
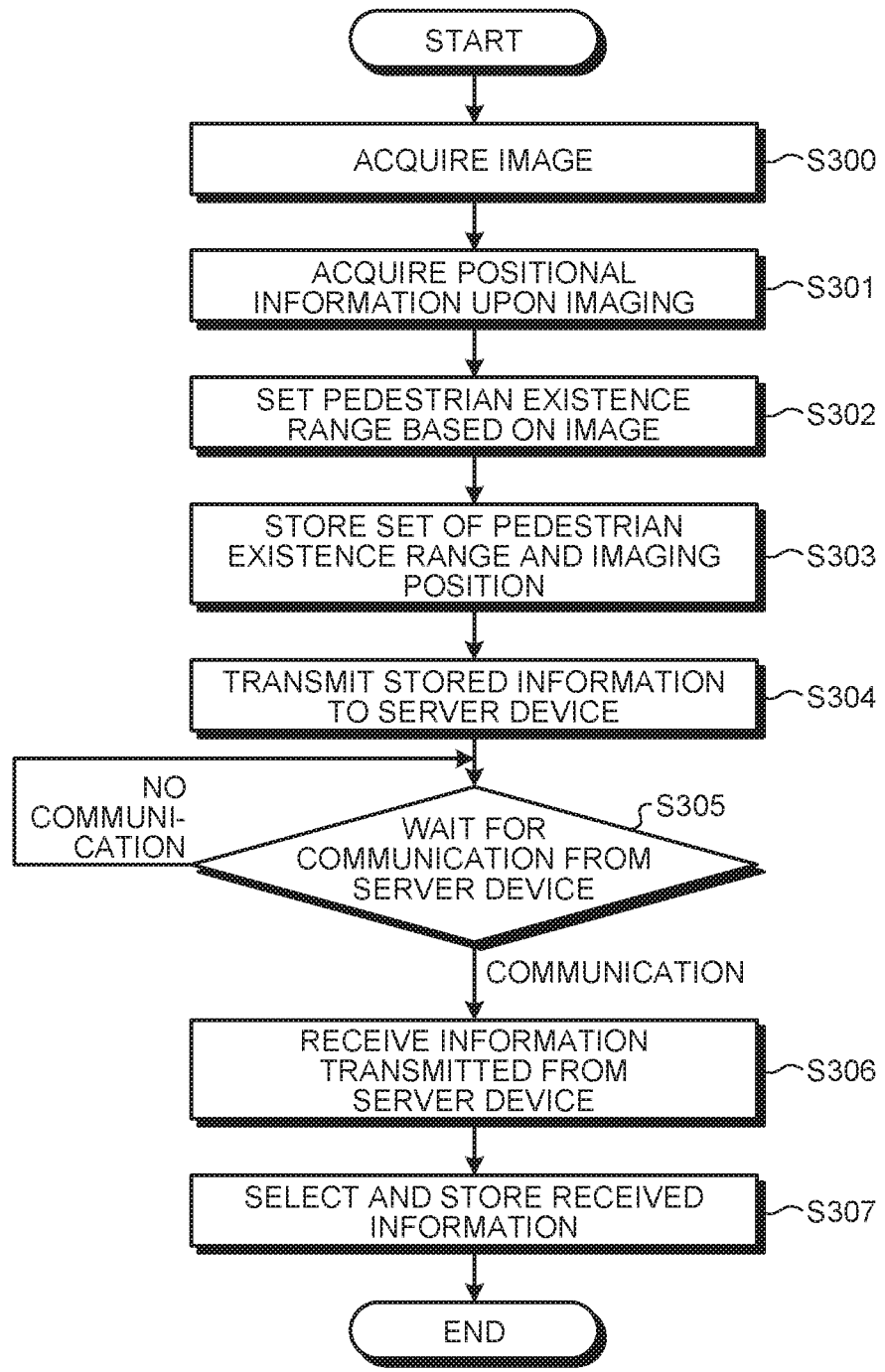
FIG. 17 is an exemplary flowchart illustrating a process in the detection device according to the third embodiment.

FIG. 17 is an exemplary flowchart illustrating a process in the detection device 10c according to the third embodiment. In step S300, the image acquirer 11 acquires the captured image. At this time, the image acquirer 11 transmits notification of acquisition of the captured image to the positional information acquirer 16. In the next step S301, the positional information acquirer 16 acquires the positional information indicating the current position, according to the notification of acquisition of the image, from the image acquirer 11.

In the next step S302, the setting controller 14 sets the pedestrian existence range based on the captured image acquired in step S300. That is, as described using the flowchart of FIG. 4, the detector 12 detects the person 203 and the movement area 201 from the captured image acquired by the image acquirer 11 (steps S101 and S102 of FIG. 4). When the person 203 detected by the detector 12 is on the movement area 201, the calculator 13 defines the person 203 as the pedestrian (step S103 of FIG. 4), and calculates the distance from the camera 110 to the pedestrian, based on the captured image and the installation attitude of the camera 110 (step S104 of FIG. 4). The setting controller 14 uses the calculated distance to set the pedestrian existence range.

In the next step S303, the storage 31 associates the positional information upon imaging acquired in step S301, and information indicating the pedestrian existence range set in step S302, and stores a first set of the positional information and the pedestrian existence range. The information indicating the pedestrian existence range includes the size of the pedestrian existence range, and information indicating the position of the detected pedestrian. The position of the pedestrian can be obtained based on the current position upon imaging and the distance from the camera 110 to the pedestrian.

In the next step S304, the transmitter 32 transmits the first set of the positional information and the pedestrian existence range stored in the storage 31 to the server device 60. Each time the first set of the positional information and the pedestrian existence range is stored in the storage 31, the transmitter 32 can transmit the stored first set of the positional information and the pedestrian existence range. Further, the transmitter 32 may transmit a plurality of first sets of the positional information and the pedestrian existence range collectively, for example, at fixed time intervals.

The first set of the positional information and the pedestrian existence range transmitted from the transmitter 32 is received by the receiver 62 in the server device 60, through the network 51. In the server device 60, the storage 64 cumulatively stores, as a second set, the first set of the positional information and the pedestrian existence range received by the receiver 62, in the DB 61. Further, when the server device 60 receives the first set of the positional information and the pedestrian existence range, from the detection device 10c, storage 64 reads one or more second sets of the positional information and the pedestrian existence range stored in the DB 61. The transmitter 63 transmits the second set of the positional information and the pedestrian existence range read by the storage 64, to the detection device 10c. The detection device 10c is a transmission source of the received first set of the positional information and the pedestrian existence range. The transmitter 63 can transmit the one or more second sets.

In step S305 of FIG. 17, the detection device 10c waits for reception, by the receiver 33, of communication from the server device 60, that is, of the second set of the positional information and the pedestrian existence range transmitted from the server device 60. When the receiver 33 does not receive communication from the server device 60, the process returns to step S305, and when the receiver 33 receives the communication from the server device 60, the process proceeds to step S306.

In step S306, the receiver 33 receives the second set of the positional information and the pedestrian existence range transmitted from the server device 60. In the next step S307, the receiver 33 selects any of the received second sets of the positional information and the pedestrian existence range, and causes the storage 31 to cumulatively store the selected second set of the positional information and the pedestrian existence range. As a result, the storage 31 stores the first set of the positional information and the pedestrian existence range, acquired and set in the detection device 10c, and the second set of the positional information and the pedestrian existence range, transmitted from the server device 60 and received and selected in the detection device 10c.

For example, the receiver 33 can acquire the current position from the positional information acquirer 16, select a second set of the positional information and the pedestrian existence range, the positional information having a distance not more than a fixed value to the current position, from the one or more the second sets of the positional information and the pedestrian existence range, received from the server device 60, and causes the storage 31 to store the selected second set. Further, the receiver 33 may cause the storage 31 not to store a second set of the positional information and the pedestrian existence range, the positional information having a distance not less than the fixed value to the current position, from the one or more second sets of the positional information and the pedestrian existence range, received from the server device 60. For example, the receiver 33 discards one or more second sets of the positional information and the pedestrian existence range not stored in the storage 31, from the received one or more second sets of the positional information and the pedestrian existence range.

Further, when a new first set of the positional information and the pedestrian existence range additionally obtained and set, or a second set of the positional information and the pedestrian existence range transmitted from the server device 60, is stored, the storage 31 may erase a predetermined number of sets of the positional information and the pedestrian existence range, older in time, from the first and the second sets of the positional information and the pedestrian existence range which have been stored.

Further, the server device 60 may be configured to normally transmits the second sets of the positional information and the pedestrian existence range, and the detection device 10c may be configured so that the receiver 33 receives, at fixed time intervals, the transmitted second sets of the positional information and the pedestrian existence range. Further, the server device 60 may be configured to select a second set of the positional information and the pedestrian existence range, the positional information having a distance not more than the fixed value to the positional information transmitted from the detection device 10c, from the second sets of the positional information and the pedestrian existence range stored in the storage 64, and transmit the selected second set to the detection device 10c.

When the processing of step S307 is finished, a sequential process according to the flowchart of FIG. 17 is finished.

The detection device 10c according to the third embodiment can include a determination unit. The determination unit determines whether a current position of the vehicle on which the detection device 10c is mounted is included in any of one or more pedestrian existence ranges, based on the positional information acquired by the positional information acquirer 16 in step S301 in the flowchart of FIG. 17, and the set of the positional information and the pedestrian existence range stored by the storage 31 in step S307. The determination unit transmits notification of a determination result to the driver of the vehicle.

Figure 18:
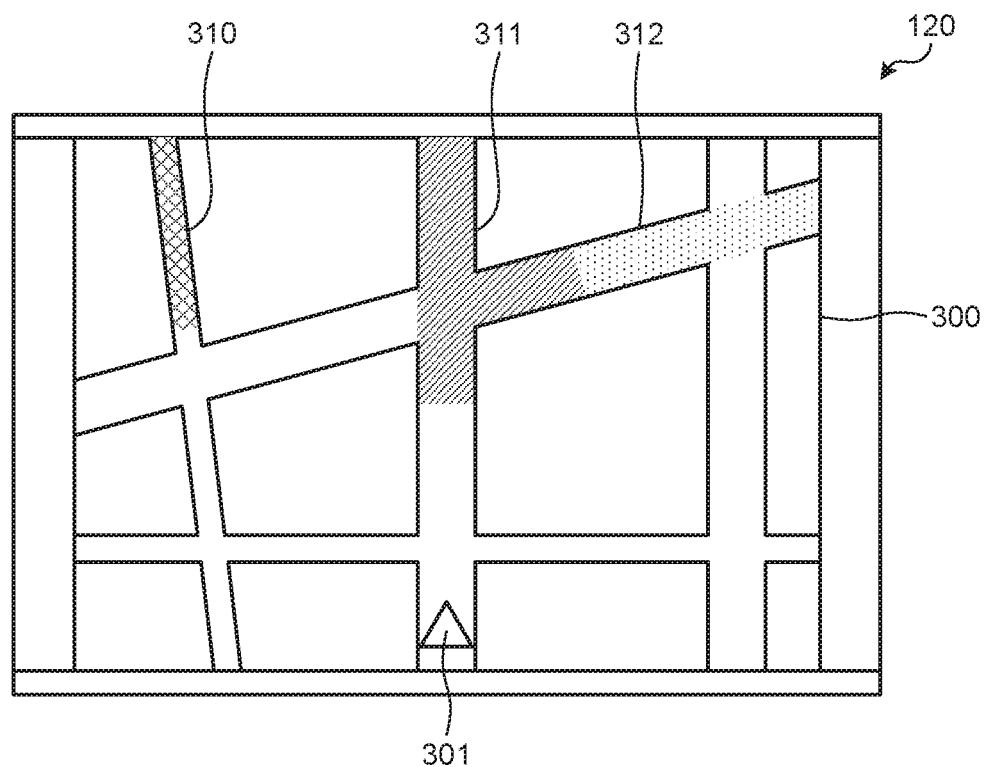
FIG. 18 is a diagram illustrating an example of a pedestrian existence range displayed on the detection device, according to the third embodiment.

FIG. 18 illustrates an example of the pedestrian existence range displayed on the display 120 of the detection device 10c, according to the third embodiment. In an example of FIG. 18, a map 300 including a vehicle 301 is displayed on the display 120. The map 300 is displayed by the display controller 15, based on, for example, the information indicating the current position acquired by the position acquisition device 108 included in the detection device 10c, and, for example, map information previously stored in the storage 104.

In FIG. 18, the detection device 10c is configured so that the display controller 15 causes the display 120 to display, on the map 300, the pedestrian existence range having a distance not more than a predetermined value to the position of the vehicle 301, selected from the first and the second sets of the positional information and the pedestrian existence range, stored in the storage 31. In an example of FIG. 18, three pedestrian existence ranges, that is, pedestrian existence ranges 310, 311, and 312 are displayed on the map 300, by a display method different from that of a road on the map 300. The three pedestrian existence ranges are displayed in different display colors in this example. Based on this display, the driver of the vehicle 301 can know that a certain range in the traveling direction of the vehicle 301 is, for example, the pedestrian existence range 311, before the vehicle 301 arrives at the pedestrian existence range 311, and the driver can pay attention to the pedestrian.

Further, the number of times of storing each of the pedestrian existence ranges 310, 311, and 312 by the storage 31 or the number thereof stored may be counted to further change the display method of each of the pedestrian existence ranges 310, 311, and 312 according to count obtained as a result of counting.

An exemplary method of counting the pedestrian existence range will be described. For example, when the setting controller 14 sets the pedestrian existence range based on the captured image acquired by the image acquirer 11, the above-mentioned determination unit acquires the positional information indicating the position at which the captured image is acquired, from the positional information acquirer 16. The determination unit determines whether there is a set including a pedestrian existence range including the position indicated by the acquired positional information within a range in the sets of the positional information and the pedestrian existence range stored in the storage 31. When there is the set, the determination unit increments the count of the corresponding set stored in the storage 31. Function of the determination unit may be included, for example, in the function of the setting controller 14.

In an example of FIG. 18, for example, a first threshold and a second threshold having a value lower than that of the first threshold are provided for the count, and according to the results of comparison between the count of each of the pedestrian existence ranges 310, 311, and 312 and the first and second thresholds, the display color of each of the pedestrian existence ranges 310, 311, and 312 is changed. As an example, when the result has a large count, the pedestrian existence range is considered to have a larger probability of existence of the pedestrian, and display is performed to indicate a higher risk.

Specifically, in FIG. 18, in the pedestrian existence ranges 310, 311, and 312, for example the pedestrian existence range 311 having a count larger than the first threshold has a color representing a higher risk (e.g., red), for example the pedestrian existence range 310 having a count less than the first threshold and not less than the second threshold has a color representing a medium risk (e.g., yellow), and for example the pedestrian existence range 312 having a count less than the second threshold has a color representing a lower risk (e.g., green).

In this configuration, the number of thresholds is not limited to two, and may be three or more or may be one. Further, the threshold may be changed according to a period of time, season, weather, or the like. For example, the threshold may be changed according to a period of time so that night has a threshold lower than that of the daytime to further draw driver's attention at night.

Note that the number of times of counting the pedestrian existence range or the number thereof counted may include the number of times of storing the pedestrian existence range set by the detection device 10c mounted to the vehicle 301 in the storage 31, or the number thereof stored, and the number of times of storing the pedestrian existence range transmitted from the server device 60 in the storage 31, or the number thereof stored. The number of times of counting the pedestrian existence range or the number thereof counted is not limited to this configuration, and may include only the number of times of storing the pedestrian existence range set by the detection device 10c mounted to the vehicle 301, in the storage 31, or the number thereof stored.

As described above, according to the count obtained as a result of counting the number of times of storing each of the pedestrian existence ranges 310 to 312 by the storage 31 or the number thereof stored, the display method of each of the pedestrian existence ranges 310, 311, and 312 are changed, and the range to which the driver's attention is to be paid can be clearly shown.

Further, although the pedestrian existence ranges 310 to 312 are displayed on the map 300 obtained based on the positional information acquired by the positional information acquirer 16, in the above-mentioned configuration, the configuration is not limited to this example. For example, the display controller 15 may cause the display 120 to display the pedestrian existence ranges 310 to 312 to overlap on the captured image acquired by the image acquirer 11.

Other Embodiments

A detection program for performing a detection process according to embodiments is provided by being recorded in a computer-readable recording medium, which may be provided as a computer program product, such as a compact disk (CD) or a digital versatile disk (DVD) in an installable format file or executable format file. The detection program is not limited to this configuration, and may be provided by being stored previously in the ROM 102.

Further, the detection program for performing the detection process according to embodiments may be provided by being stored on a computer connected to a communication network such as the Internet, and by being downloaded via the communication network. Further, the detection program for performing the detection process according to embodiments and a modification may be configured to be provided or distributed via the communication network such as the Internet.

In the first embodiment, the detection program for performing the detection process according to embodiments and a modification has, for example, a module configuration including the above-mentioned units (the image acquirer 11, the detector 12, the calculator 13, the setting controller 14, and the display controller 15). As actual hardware, the CPU 101 reads, for example, the detection program from the storage 104 and executes the detection program, the units are loaded on a main storage device (e.g., RAM 103), and the units are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection device comprising:
processor circuitry configured to:
   acquire, from a camera connected to the processor circuitry, an image including an area in which a mobile body is movable;
   detect at least the area and a person from the image;
   calculate a first distance between the person and a position of the device when the person is in the area; and
   set a range around a position at which the person is detected, according to a result of the detection and the first distance, the range being an area range in which any person is estimated to be present after the person is detected;
   store the area range in association with positional information at a first time period; and
   present the area range to a user at a second time period, wherein the second time period corresponds to a time period during which the detection device is within a particular distance of the area range corresponding to the positional information regardless of the presence of a person within the area range, and wherein the second time period occurs later than the first time period.

2. The device according to claim 1, wherein
the processor circuitry detects a crosswalk mark from the image, and
the processor circuitry sets the range based on the crosswalk mark and the first distance, and reduces the set range as a second distance between the crosswalk mark and the person is reduced.

3. The according to claim 1, wherein
the processor circuitry estimates an age of the person detected, and
the processor circuitry increases the size of the set range, when the age is smaller than a first threshold or larger than a second threshold, the second threshold being larger than the first threshold.

4. The device according to claim 1, wherein
the processor circuitry detects at least one vehicle and a cross mark from the image, and
the processor circuitry recognizes a vehicle being stopped of the at least one vehicle detected, as a stopped vehicle, sets the range based on the crosswalk mark and the first distance, and increases the set range as a third distance between the stopped vehicle and the person is reduced.

5. The device according to claim 1, further comprising a memory connected to the internal bus and stores data and a program.

6. The device according to claim 1, wherein
a memory stores a set of the range and positional information representing a position at which the image is acquired corresponding to the range; and
the processing circuitry determines whether a position at which an image used for setting the range is included in the range stored in the memory.

7. The device according to claim 1, wherein the processing circuitry presents the area range to the user in response to being the particular distance from the position subsequent to a time period where the user is more than the particular distance from the position.

8. A detection method implemented by a detection device comprising:
   acquiring an image including an area in which a mobile body is movable;

detecting at least the area, a mark on the area, and a person, from the image;
calculating a first distance between the person and a position of the device when the person is in the area; and
setting a range around a position at which the person is detected, according to a result of the detection and the first distance, the range being an area range in which any person is estimated to be present after the person is detected;
storing the area range in association with positional information at a first time period; and
presenting the area range to a user at a second time period, wherein the second time period corresponds to a time period during which the detection device is within a particular distance of the area range corresponding to the positional information regardless of the presence of a person within the area range, and wherein the second time period occurs later than the first time period.

9. An information processing system comprising:
a server device; and
a detection device, wherein the detection device comprises:
  a camera configured to acquire a captured image captured including an area in which a mobile body is movable, and positional information representing a position at which the captured image is captured;
  processing circuitry configured to:
    detect at least the area, a mark on the area, and a person, from the captured image;
    calculate a distance between the person and a position of the detection device when the person is in the area;
    set a range around a position at which the person is detected, according to a result of detection performed by the processor circuitry and the distance, the range being an area range in which any person is estimated to be present after the person is detected;
    store the area range in association with positional information at a first time period; and
    present the area range to a user at a second time period, wherein the second time period corresponds to a time period during which the detection device is within a particular distance of the area range corresponding to the positional information regardless of the presence of a person within the area range, and wherein the second time period occurs later than the first time period;
  a first transmitter configured to transmit, to the server device, at least one first set of the positional information and the range;
  a first receiver configured to receive a second set of the positional information and the range transmitted from the server device; and
  a first storage configured to store therein the second set and the first set, and
the server device comprises:
  a second receiver configured to receive the first set transmitted from the detection device;
  a second storage configured to store the first set received by the second receiver, as the second set; and
  a second transmitter configured to transmit the second set stored in the second storage, to the detection device.

10. The system according to claim 9, wherein the processing circuitry determines whether a position at which an image used for setting the range is included in the ranges of the first set and the second set stored in the storage.

11. The device according to claim 1, wherein the processing circuitry changes a size of the range according to the first distance.

* * * * *